Aug. 20, 1946.                 H. D. BEACH                 2,405,989
                                  LENS
                           Filed Aug. 12, 1941
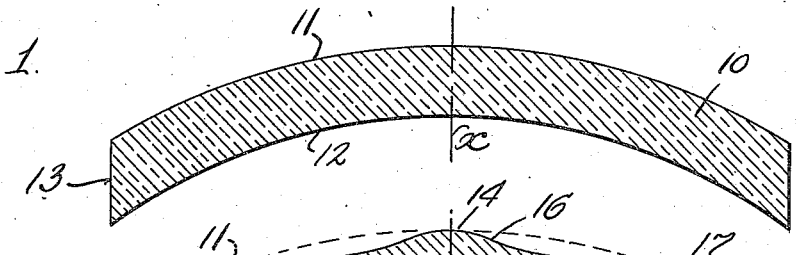
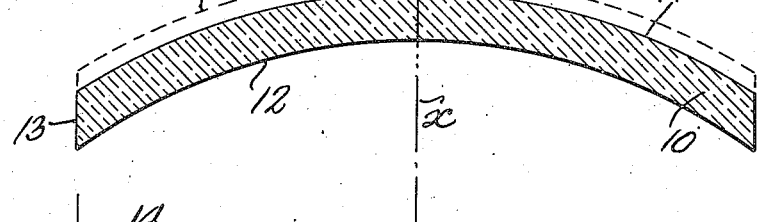
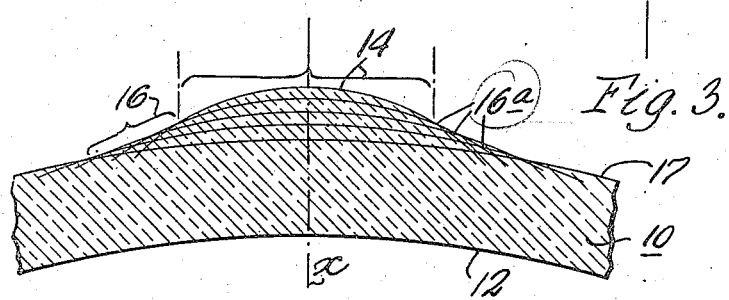
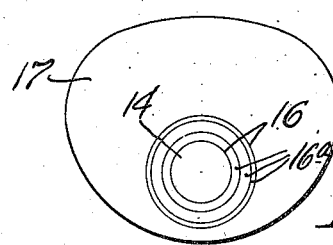
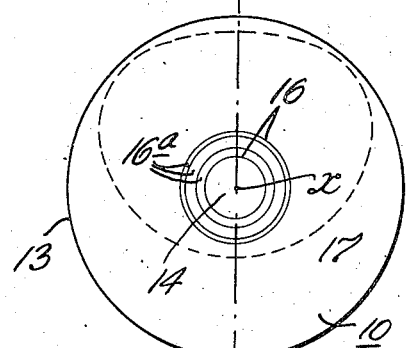
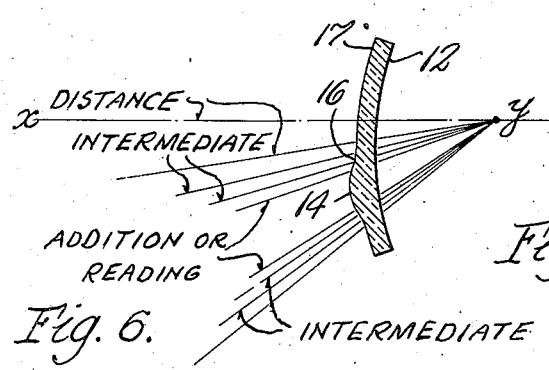
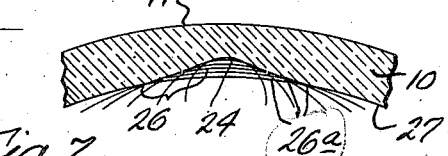
INVENTOR
Howard D. Beach
BY
Parker, Prochnow & Farmer
ATTORNEYS Patented Aug. 20, 1946

2,405,989

UNITED STATES PATENT OFFICE 2,405,989

LENS

Howard D. Beach, Buffalo, N. Y., assignor to Beach Lens Corporation, Buffalo, N. Y.

Application August 12, 1941, Serial No. 406,488

14 Claims. (Cl. 88—54)

This invention relates to optical lenses, spectacles or eyeglasses and particularly to a novel and improved multi-focal spectacles lens.

In bifocal or multi-focal lenses as heretofore made, a body portion formed of glass of a given index of refraction is employed and which has its major portion surfaced for distance vision, the bifocal or multi-focal characteristics being attained by one or more sections or pieces of glass, of different refractive character, each of uniform, but different focal curvature or curvatures which is or are fused or otherwise secured to the main body to provide the addition or power zone for reading vision, and the zone for intermediate vision respectively. Such sections usually constitute only a minor zone or area of the lens surface.

It is well known that all such lenses have the objection that when the user, in shifting his gaze to look through one and then another of the zones mentioned, experiences discomfort and uncertain or aberrant vision as the gaze passes over the juncture of adjoining zones, due to the abrupt line of demarcation between these zones.

An object of this invention is to provide an improved multi-focal spectacles lens, by the use of which the aforementioned disadvantages are avoided and in which no discomfort or sudden jump is experienced as the user directs his gaze through one and then another zone of the lens.

Another object of the invention is to construct a multi-focal spectacles lens, having the stated improved characteristics, and formed of a single piece or body of optical glass or the like material, having a uniform index of refraction throughout.

Another object of the invention is to provide an improved multi-focal spectacles lens, with which objects at a plurality of different distances from the wearer, and viewed through such lens, will appear in proper focus as the gaze is lowered from straight ahead or infinity vision to the close up or reading vision.

A further object is to provide an improved semi-finished spectacles lens blank which may be used by manufacturing opticians and others for filling a spectacles prescription in the provision of a multi-focal spectacles lens in accordance with this invention, and also to provide a set of semi-finished plano lens bodies or lens blanks, each having a uniform index of refraction throughout, which may be stocked by manufacturing opticians and from which blanks may be selected to produce multi-focal lenses according to this invention with a minimum of grinding operations and a minimum stock of blanks.

Other objects are to provide an improved and novel multi-focal spectacles lens, which is of minimum thickness for a selected prescription; which has no visible line or lines of demarcation between the various zones thereof, and which, in use, will be of attractive appearance and of maximum light transmitting quality.

Another object is to construct a multi-focal spectables lens which will be of particular value in aiding the vision of those who have had cataract operations.

Another object of the invention is to provide an improved optical lens with a relatively large lateral field adjoining a zone of maximum magnification, whereby objects at different distances will be in focus as one looks through different parts thereof.

Various other objects and advantages of the invention will be apparent from the following two embodiments thereof, and the novel features will be pointed out in connection with the appended claims:

In the accompanying drawing:

Fig. 1 is a medial section of a plano lens blank used in the production of a multi-focal spectacles lens in accordance with my invention.

Fig. 2 is a similar section of the blank which has been ground to provide a reading or addition zone and intermediate distance vision zone thereon, the section being taken on line 2—2, Fig. 4.

Fig. 3 is an enlarged and exaggerated fragmentary medial section of the central portion of the lens shown in Fig. 2.

Fig. 4 is a face view of the lens of Fig. 2.

Fig. 5 is a similar view view of a finished spectacle lens which has been cut from the lens of Fig. 4.

Fig. 6 is a diagrammatic view illustrating the action of my improved multi-focal lens.

Fig. 7 is a fragmentary medial section of a slightly modified form of my multi-focal lens.

In producing a one piece, multi-focal spectacles lens in accordance with this invention, a plano lens blank or body of the same index of refraction throughout and having a selected or suitable base curve is utilized. A face of such a blank, preferably the outer face, is ground or surfaced so as to produce on a selected and restricted or minor zone thereof, an addition or power area or reading vision zone of given strength and which is surrounded or bounded by a plurality of relatively narrow zones which are ground to give weaker addition or power progressively away from the first mentioned addition zone. In the finished lens, there are no lines of demarcation between the intermediate zones, the first mentioned addition zone and the remaining area of the face of the lens, as the grinding is so done that the zones merge into one another and into the body in a manner to form an unbroken curve in cross section.

In the example of the invention illustrated in Figs. 1 to 6 of the drawing, a suitable plano lens blank or body 10, of concavo-convex form, such as that shown in Fig. 1, is preferably used, and which is initially of circular form in face view, as indicated in Fig. 4. Such lens blanks are commercially available and are now generally used in the production of spectacles or eyeglasses, and upon which the desired prescriptions, in accordance with present practice, are ground.

The plano lens blank 10 has the same medial cross section in all directions and in any such section, the blank has parallel outer and inner spherical faces 11 and 12, generated on a common center, and the radii of the faces 11 and 12 may vary in different blanks to produce different desired base curves.

A base curve of proper numerical value is selected for a particular prescription or type of work, and the axis $x$ of generation of such curve is equidistant from all points on the periphery 13 of the blank 10.

To produce the desired addition or reading zone and intermediate vision zones mentioned above, one of the faces of the plano lens blank, preferably the outer face 11, is ground down as indicated in Fig. 2, so as to leave in the center of that face 11 a minor zone 14 of the required number of diopters of addition, see Fig. 3, and which zone is substantially a portion of a sphere, the axis of which lies upon the axis $x$.

As shown in the enlarged and exaggerated fragmentary section of Fig. 3, there is disposed between the marginal portions of the addition or reading zone 14 and the adjacent surface of the body 10 an intermediate distance vision area or zone 16, the marginal portions of this zone 16 being connected to the adjoining marginal position of the zone 14 and of the body surface. This zone 16 is composed of a plurality of relatively narrow annular addition zones 16a disposed side by side and preferably concentric with the axis $x$ and which are arranged so that they become progressively weaker in additive power as the distance from the zone 14 increases.

It will be noted, as seen in Fig. 2, that the grinding operation, which produces the zones 14 and 16, also removes from the body a portion or area of the front of the blank or body 10, leaving a new front surface or plano area 17, which, however, is concentric with the original center of curvature of the face 11 so that the face 17 is of the same base curve as that of the original face 11 and of the rear face 12.

The medial cross section of the lens, in Figs. 2 and 3, is such that the addition or reading vision zone 14, the intermediate vision zone 16 and the adjacent or surrounding portions of the remaining plano surface 17 all merge or blend into one another in a continuous unbroken curve without any lines or abrupt changes in direction of the surface or visible indication of the presence of different zones. This is shown in an exaggerated manner in Fig. 3, and it should be understood that while the zones 14 and 16 are illustrated in the drawing as an appreciable convex projection or hump on the face of the lens body, these zones, in an actual lens, are so slightly elevated as to be almost invisible, especially after the lens has been polished, although their presence can be detected and accurately measured and checked by the use of an optometrist's gage.

It should be understood that, by reason of the small area occupied by the intermediate zone 16 in a lens of actual size, the zones 16a of which such area is composed are, particularly after polishing, so narrow or minute as to be substantially individually indiscernible.

When the grinding has been completed, the ground face of the lens body is polished in any usual or suitable way, the back is then surfaced to satisfy a prescription, and then peripheral or marginal portions of the body are cut away, as usual, to produce a finished spectacles lens of the desired shape or contour, as indicated in broken lines in Fig. 4, and in full lines in Fig. 5.

The cutting of the final shape is, of course, done in a manner to locate the addition or reading zone 14 and the intermediate zone 16 in the correct position for the intended user.

It will be apparent that in addition to selecting a plano blank or body of the proper or desired base curve, the addition or reading zone 14 may be made of any desired curvature or dioptric requirements and also that the intermediate vision zone 16 may be relatively narrow and deep or relatively wider and more shallow or flatter, as desired, or as deemed necessary. In any event, the zone 16 will vary somewhat in this respect in accordance with variations in the dioptric characteristics of the reading zone 14.

While, as stated, the addition or reading vision zone or area and the intermediate vision zone are preferably formed on the outer, convex surface of the lens blank, these zones can, if desired, be formed on the opposite or concave face, as shown in Fig. 7. In this figure, the addition zone is indicated at 24, and this zone is surrounded by an intermediate vision zone 26 which is composed of a plurality of relatively narrow annular zones 26a which are of progressively weaker addition value in a direction away from the zone 24, as in the first described form. The zone 26 merges imperceptibly and without abrupt change into the plano portion 27 and the zone 26 of the lens body.

In practice, the minute annular areas 16a or 26a comprising the intermediate zones 16 or 26 are so formed and disposed that the area 16a or 26a which is immediately adjacent to and merges with the reading zone 14 or 24 is of only very slightly less additive power than that of said reading zone, while the annular area 16a or 26a which is immediately adjacent and joins the base curve area on the same face is of only very slightly greater additive power than that of the distance vision area or prescription which is applied to the other face of the lens. The remaining additive areas between these two extremes become progressively weaker in very small increments as they progress from the first mentioned area, that is, the one next to the reading zone, to the additive area adjoining the base curve.

Thus, although the reading zone and the intermediate zone are on one face of the lens and the distance vision zone is on the other, there is absolutely no jump and discernible separation between the three zones as the eye, looking through the lens moves progressively from one zone to another. It will be understood that in the form of the invention illustrated in Figs. 1 to 6, a distance prescription and also, when required, a prism form and/or a cylinder correction for astigmatism will be surfaced upon the inner face 12, and since the major portion of the opposite finished face 17 is a plano base curve, all of such area of the lens is available and permits free use for distance vision therethrough.

In the form shown in Fig. 7, the foregoing prescription surfacing can be performed on the outer face 11 of the lens blank.

The advantages attained in the use of my improved multi-focal spectacles lens above described, may be appreciated by an examination of the diagrammatic illustration Fig. 6.

In this figure, the eye is indicated at $y$ and my multi-focal lens is shown in operative relation thereto.

When the user looks through the non-addition portion or area 17, he can, by reason of the prescription surfaced on the inner face 12, have clear and unobscured infinity vision therethrough, and since the zones 14 and 16 are disposed eccentrically of the axis $x$ and below the main area of the zone 17, he will have progressively closer focus as the eye, looking through the lens, moves progressively from the non-additive zone through the intermediate zone 16 to the reading or addition zone 14. In such performance, the user will experience absolutely no jump or discomfort as the zones blend imperceptibly one into the other.

Obvious practical advantages in the manufacture and use of these improved spectacles lens will be apparent to those skilled in the art. For example, after the addition or reading zone and the intermediate zones have been made, and these areas and the remaining base-curve area have been polished the face on which that work has been done remains absolutely undisturbed and unaltered during the subsequent operations required to meet the further requirements of a prescription.

Distance vision surfacing, prism and/or cylinder requirements, when specified are all performed on the face opposite to that upon which the reading and intermediate zones have been applied.

Thus the blending of the intermediate zone into the two adjacent zones are unaltered, and full advantage of the intermediate zone may be had throughout its width. On the other hand, work necessary to produce a prism requirement, with consequent tilting of the axis for this work with respect to the axis $x$, if done on that face having the reading and intermediate zones thereon, would destroy portions of the intermediate zone and reduce its effectiveness. This does not occur in the present case wherein the prism work is done on the other face.

In addition, the relatively large plane or base curve area which remains on the selected face, after producing the reading and intermediate zones on that face, remain as a definite predetermined value, with which the distance prescription on the opposite face can be produced to cooperate in exactly meeting the requirements of that prescription, in a simple and direct manner, and with standard apparatus.

Thus with a pair of spectacles lenses formed in accordance with this invention, a user will have improved vision during convergence, since there is no jump to mar the gradual and imperceptible change in passing from one zone to another.

Lenses of the kind herein disclosed may be made in any suitable way, as by mounting the lens blank for rotation about the axis $x$ and providing a suitable tool having a face contour complementary to that required on the lens, which tool is also mounted on the same axis of rotation. Suitable abrasive, such as a strip of emery cloth may be introduced between the adjacent faces of lens blank and tool and the grinding action is proceeded with until the lens blank has the desired surface contour.

The ground face is then polished in a manner well known in the art.

Lenses constructed in accordance with this invention are of value for use by persons who have had cataracts removed, in which case, the addition zone 14 and the surrounding intermediate zone 16 are placed in the center of the finished lens. By use of such lens or lenses, these persons may have an increased field of vision through the presence of the intermediate zone on the lens, as compared with the limited field of vision offered by the central portion of the double convex lenses heretofore provided for such persons. Also a much thinner lens is provided as compared with the thickness of the double convex lenses.

By this invention, one is enabled to produce a set of semi-finished polished multi-focal lens blanks, each of a uniform index of refraction throughout, for use of manufacturing opticians and others, from which blanks may be selected to fill a prescription, the set being composed of groups of units having different selected base curves which differ progressively from one another by selected increments. The units of each group are provided, upon the face with the selected base curve, with selected addition or reading zones of different additive strengths merged into the body of the blank by intermediate distance vision zones. When the correct blanks have been selected from such a set of semi-finished blanks, it is only necessary to surface the other or unfinished or plano faces by applying the desired distance prescription and cylinder or prism corrections, when needed, then polish the blank and cut it to the desired shape.

I claim as my invention:

1. A multi-focal spectacles lens comprising a one piece lens body of light transmitting and refracting material of uniform index of refraction throughout, and having upon one face thereof a reading zone of substantial area but constituting a minor part of said face, said zone having a substantially spherical curvature formed to give the desired reading addition to the body, said body also having formed upon the same face thereof and bordering the reading zone, a plurality of intermediate addition curved areas of relatively narrow width arranged side by side and adjoining one another, and of weaker addition power progressively away from said reading zone to provide multi-focal vision zones, the innermost of said intermediate zones adjoining said reading zone and the outermost of said intermediate zones adjoining said one face, the addition curved areas being formed to blend the addition zones gradually into one another and into the remaining area of said face to provide a smooth surface free of abrupt changes in direction joining the reading zone and the remaining area of said face.

2. A multi-focal spectacles lens comprising a one piece lens body of light transmitting and refracting material of uniform index of refraction throughout and having upon one face thereof a reading zone of substantial area but constituting a minor part of said face, said zone having a substantially spherical curvature formed to give the desired reading addition to the body, said body also having formed upon the same face thereof and bordering the reading zone, a plurality of intermediate addition curved areas of relatively narrow width arranged side by side and adjoining one another, and of weaker addition power progressively away from said reading zone to provide multi-focal vision zones, the innermost of said intermediate zones intersecting said reading zone and the outermost of said intermediate zones intersecting said one face, the addition curved areas being formed to blend the addition zones gradually into one another and into the remaining area of said face to provide a smooth surface free of abrupt changes in direction joining the reading zone and the remaining area of said face, said body having its opposite face surfaced in accordance with a distance vision prescription.

3. A spectacles lens blank for making a multi-focal spectacles lens comprising a plano lens body of uniform index of refraction throughout, and one face of which is a spherical base curve, said lens body having upon said one face thereof a reading zone of substantial area, but constituting a minor part of said face, formed to a substantially spherical curvature to give a desired reading addition to that zone, and a plurality of relatively narrower zones occupying a portion only of the remaining area of said base curve face, and which are arranged side by side, and are formed to give weaker addition powers from zone to zone than said one zone in a direction progressively away from said one zone, the innermost of said intermediate zones intersecting said reading zone and the outermost of said intermediate zones intersecting said base curve face to provide narrow intermediate vision zones becoming progressively weaker as the distance from said reading zone increases, the surfaces of said intermediate zones, said one zone, and the remaining area of said base curve face being formed to merge into one another free of abrupt changes in surface.

4. A multi-focal spectacles lens comprising a one piece lens body of light transmitting and refracting material of uniform index of refraction throughout and having one face thereof of substantially spherical curvature, a substantially circular reading zone of substantial area which is non-coincident with said face, said zone having a curvature formed to give the desired reading addition to the body, said body also having formed upon the same face thereof and extending from the border of said non-coincident reading zone, towards and adjoining said face an intermediate zone formed of a plurality of addition curved areas of relatively narrow width, arranged side by side and adjoining one another, and which areas are of weaker addition power progressively away from said reading zone to provide multi-focal vision zones, the addition curved areas being formed to blend said intermediate area into said reading zone and into the remaining area of said face to provide a smooth surface free of abrupt changes in direction joining the reading zone and the remaining area of said face, said addition areas being of approximately circular circumference and concentric to one another.

5. A spectacles lens blank for making a multi-focal spectacles lens comprising a plano lens body of uniform index of refraction throughout, and having upon one face thereof a major area finished with a selected base curve, and also having on that face a reading addition zone of substantial area, but constituting a minor part of said face, and a plurality of relatively narrow zones connecting said major and minor areas of said face, adjoining one another, side by side, and formed to give weaker addition powers from zone to zone than said addition zone in a direction progressively away from said zone, to provide narrow intermediate vision zones becoming progressively weaker as the distance from said reading zone increases, the surfaces of said intermediate zones, and those of said major and minor zones being formed to merge into one another free of abrupt changes in surface, and said reading and intermediate zones being of approximately circular circumference and concentric to one another.

6. The spectacles lens substantially as set forth in claim 1, in which said one face is a convex face.

7. The spectacles lens substantially as set forth in claim 1, in which said one face is a convex face, and said reading and intermediate addition zones are a convex projection on said one face.

8. A spectacles lens blank for making a multi-focal spectacles lens comprising a plano lens body of uniform index of refraction throughout, and having upon one face thereof a major area finished with a selected base curve, and also having on that face a reading addition zone of substantial area, but constituting a minor part of said face, and a plurality of relatively narrow zones connecting said major and minor areas of said face, adjoining one another, side by side, and formed to give weaker addition powers from zone to zone than said addition zone in a direction progressively away from said zone, to provide narrow intermediate vision zones becoming progressively weaker as the distance from said reading zone increases, the surfaces of said intermediate zones and those of said major and minor zones being formed to merge into one another free of abrupt changes in surface, and said one face being a convex face and said reading and intermediate zones being a convex projection upon said one face.

9. A set of semi-finished spectacles lens blanks for use of manufacturing opticians in filling spectacles prescriptions which comprises a plurality of plano lens bodies, each of uniform index of refraction throughout, said bodies having corresponding surfaces of desired and selected base curvatures which differ in groups from one another in said base curvature progressively by selected increments, and each body having upon the said surface with said base curve, a reading addition zone of substantial area, but constituting a minor part of said face, formed to give a desired reading addition to that zone, and a plurality of relatively narrow zones connecting said major and minor areas of said face, adjoining one another, side by side, and formed to give weaker addition power from zone to zone than said addition zone in a direction progressively away from said zone, to provide narrow intermediate vision zones becoming progressively weaker as the distance from said reading zone increases, the surfaces of said intermediate zones and those of said major and minor zones being ground to merge into one another free of abrupt changes in surface, and the reading segment additions for different bodies of each group being different by selected increments.

10. A multi-focal spectacles lens comprising a one piece lens body of light transmitting material of uniform index of refraction throughout, having one face thereof finished with a selected base curve over the major part of the area of that face and representing a zone through which infinity vision is desired, another and minor area of said one face being finished with a curvature representing a selected addition power over said base curve and constituting a reading zone, said two zones being joined to one another by a plurality of intermediate relatively narrow zones adjoining one another side by side and concentric to one another with the surface curvatures of said intermediate areas formed to give addition powers progressively weaker by relatively small increments in a direction away from the marginal part of said reading zone to the bordering part of said infinity vision zone, said body having its opposite face surfaced to give with said major part of said one face an optical effect in accordance with a desired prescription.

11. A multi-focal spectacles lens comprising a one piece lens body of light transmitting material of uniform index of refraction throughout, and having upon one face and in one zone thereof a curved surface representing a desired reading addition of substantial area but constituting a minor part of said face, said body having its opposite face surfaced to provide with the curvatures of said one face, a selected optical effect in accordance with an infinity vision prescription, said body also having upon said first face thereof and bordering the reading zone, a plurality of intermediate addition curved areas of relatively narrow width, adjoining one another, that one of said intermediate areas immediately adjoining said reading zone being weaker than, but closely approaching the addition power of said reading zone, and that one of said intermediate areas immediately adjoining the remaining major area of said first face being stronger than, but closely approximating the power of said infinity vision prescription, and said other intermediate areas being of weaker addition powers progressively away from said area adjoining reading zone to said addition area adjoining said first lens face, the addition curved areas being blended gradually into one another and into said reading zone formed by said major area of said face and the surfacing of said other face to provide a smooth surface free of abrupt changes in direction, said reading zone being disposed eccentrically of said lens body so as to be in position for downwardly directed normal reading therethrough, the major zone being in position for infinity vision therethrough, and the intermediate zones being disposed in positions for vision therethrough with progressively closer focus as the eye, looking therethrough, moves progressively from the major zone to the reading zone.

12. An optical lens comprising a one-piece lens body of light transmitting material of uniform index of refraction throughout, having one face thereof finished with a selected addition curve over a substantial area of that face and providing a vision zone of uniform magnifying power, said one face having adjoining said one zone a plurality of relatively narrow zones concentric to said one zone and to each other, with the surface curvatures of said narrow zones formed to give addition powers of progressively weaker magnifying power, by relatively small increments in a direction away from the marginal part of said vision zone, said small zones being additionally blended into each other and to said vision zone at their abutting margins, and said body having its opposite face surfaced to give with said one zone a predetermined optical effect.

13. An optical lens comprising a one-piece lens body of light transmitting material of uniform index of refraction throughout, having a convex face thereof finished with a selected addition curve over a substantial area of that face and providing a vision zone of uniform magnifying power, said one face having adjoining said one zone a plurality of relatively narrow zones concentric to said one zone and to each other, with the surface curvatures of said narrow zones formed to give addition powers of progressively weaker magnifying power, by relatively small increments in a direction away from the marginal part of said vision zone, said small zones being additionally blended into each other and to said vision zone at their abutting margins, and said body having its opposite face surfaced to give with said one zone a predetermined optical effect.

14. A multi-focal lens comprising a single piece of light transmitting material of uniform index of refraction having a substantial part of one face of a uniform curvature to afford one uni-focal zone of substantial area, another substantial part of said one face of a different uniform curvature to afford another uni-focal zone of substantial area, but of different light refractive properties than said one zone, and having a plurality of side by side, narrow zones interposed in succession on said one face between said uni-focal zones and having light refractive powers intermediate those of said uni-focal zones but of progressively weaker power by increments from the narrow zone adjoining the uni-focal zone of stronger power to the narrow zone adjoining the uni-focal zone of weaker power, said narrow zones having their surfaces merged smoothly into each other and to said uni-focal zones along their abutting margins to avoid abrupt changes in power between zones.

HOWARD D. BEACH.